United States Patent [19]

Skubic

[11] 4,041,612
[45] Aug. 16, 1977

[54] JAW TENSIONING DEVICE

[76] Inventor: Robert P. Skubic, 1005 Grant, Clawson, Mich. 48017

[21] Appl. No.: 671,595

[22] Filed: Mar. 29, 1976

[51] Int. Cl.² .............................................. G01B 3/30
[52] U.S. Cl. ................................ 33/181 R; 279/1 L; 279/1 SJ; 279/123
[58] Field of Search ................... 33/181 R, 185 R; 279/1 A, 1 R, 1 L, 1 SJ, 123; 82/34

[56] References Cited

U.S. PATENT DOCUMENTS

| 2,925,282 | 2/1960 | Borsetti | 279/1 SJ |
| 3,104,474 | 9/1963 | Rehart | 33/181 R |
| 3,945,654 | 3/1976 | McMullen | 33/181 R X |

Primary Examiner—Charles E. Phillips
Attorney, Agent, or Firm—Gifford, Chandler, Sheridan & Sprinkle

[57] ABSTRACT

A device for radially tensioning the jaws of a chuck to permit the jaws to be accurately machined. The device comprises a flat ring coaxially mounted onto the chuck and having a cam slot formed therein for each of the jaws of the chuck. A cam follower is associated with each of the jaws and comprises a first portion fixed to its associated jaw and a second portion slidably received in the cam slot in the ring which is associated with the jaw whereby rotation of the ring radially tensions the jaws via the cam followers.

8 Claims, 5 Drawing Figures

JAW TENSIONING DEVICE

BACKGROUND OF THE INVENTION

Field of the Invention

The present invention relates generally to a device for radially tensioning movable jaws of a chuck of a machining tool and, more particularly to such a device for fixedly positioning the jaws of the chuck for machining the jaws to fit a given workpiece.

Description of the Prior Art

Conventional machine tools, such as lathes, and the like, usually include a chuck having at least two radially movable permanent jaws and means for adjusting the radial position of the jaws. While the usual permanent jaws of the machining tool may be used to grip most workpieces, the necessity often arises for a set of jaws with inner gripping faces that are accurately machined to fit a workpiece of a specific diameter. This is especially true in close tolerance work. In such an event soft jaws either replace or are attached to the permanent jaws and thereafter are machined by a cutting tool to form the accurately curved and centered gripping faces.

However, in order to machine the soft jaws, the jaws must be rigid immobilized with the inner faces of the soft jaws accessible to the cutting tool. Rigid immobilization of the jaws cannot be achieved by the conventional jaw adjusting mechanism on the chuck due to the play or backlash of the jaw adjustment mechanism. Consequently, one previous method of machining the soft jaws has included placing a thin spacer at the inner axial end of the jaws and thereafter clamping the jaws onto the spacer to thereby eliminate the play of the jaw adjustment mechanism.

Due to the difficulty of obtaining an appropriately sized spacer. M. A. Riehart in his U.S. Pat. No. 3,104,474 which issued on Sept. 24, 1963, discloses an adjustable spacer for setting the chuck jaws of a lathe. Other similar devices have also been previously known but to my knowledge, all have been disposed inside the jaws with the backlash removed by tightening the jaws down onto the device.

These previously known devices, adjustable or otherwise, suffer several disadvantages unknown to the present invention. One such disadvantage is that the previously known devices are somewhat difficult to use in operation. In particular, the device must be precisely centered within the chuck and in addition must lie precisely in a radial plane of the chuck.

A still further disadvantage of these previously known devices is that although the spacer is placed at the inner axial end of the jaws, the device nevertheless interferes with the machining tool used to machine the soft jaws. For example, if the machining tool is extending too far into the chuck jaws the machining tool would contact and displace the device. In such an event the jaws would no longer be rigidly immobilized and the cutting tool would badly damage the soft jaws.

Also since a portion of the inner surface of the jaws is engaged by the device, this portion of the jaws cannot be machined and in close tolerance work or in applications where the workpiece must extend quite far into the chuck, this interferes with the accuracy.

SUMMARY OF THE PRESENT INVENTION

The device of the present invention overcomes the above mentioned disadvantages of the previously known jaw setting devices by providing such a device which radially tensions the jaws of a machining tool, such as a lathe, and which is not only simple and efficient in operation but which fits entirely outside the jaw opening so as not to interfere with operation of the machining tool being utilized to machine the jaws.

The present invention achieves these ends by providing a flat ring mounted coaxially onto the outside of the chuck. The ring includes a cam slot formed therethrough for each jaw of the chuck. A cam follower is likewise provided for each jaw and includes a first portion fixed to the jaw and a second portion which is received through the cam slot in the ring associated for that jaw. Consequently, rotation of the ring relative to the chuck radially biases the jaws, either outwardly or inwardly, of the chuck due to the coaction between the cam follow and the cam slot. This movement of the jaws takes the backlash out of the adjusting mechanism and thereby effectively immobilizes the jams so that they can be accurately machined.

After the jaws have been adjusted to the desired radial position and radially tensioned and immobilized by the tensioning device of the present invention, the inner radial faces of the soft jaws are machined by any appropriate cutting tool means. It will be appreciated that the cutting tool may extend axially into the chuck as far as desired without fear of interference from the previously known spacers. There is also nothing engaging the inner surface of the jaws so that the entire inner surface can be machined.

Moreover, unlike the previously known spacers, the tensioning device of the present invention is not only simple but also efficient in operation.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which.

DETAILED DESCRIPTION OF THE PRESENT INVENTION

Figure 1:
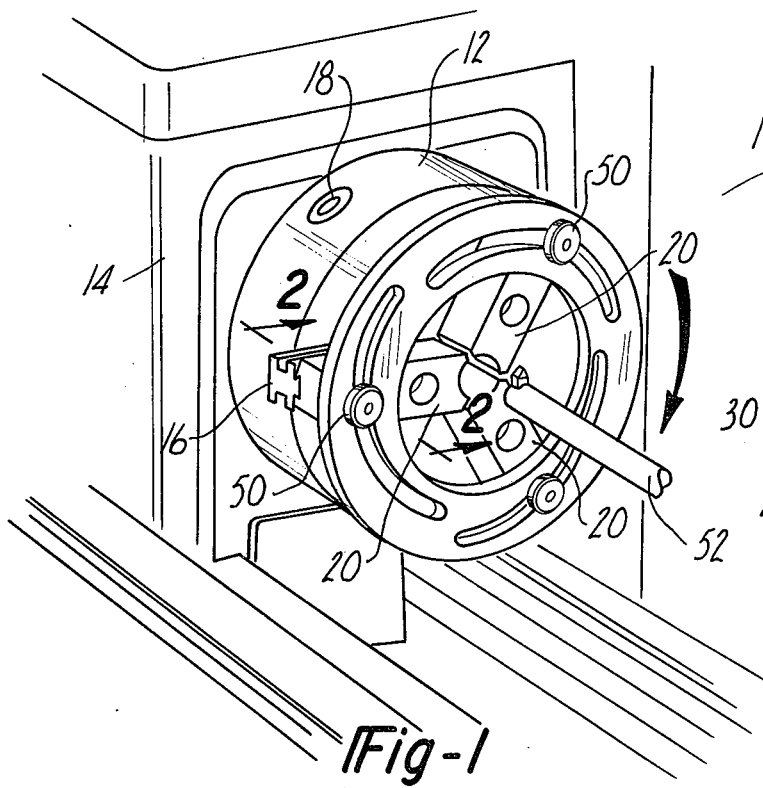
FIG. 1 is a perspective view showing the tensioning device of the present invention mounted onto a chuck of a machining tool.

With reference first particularly to FIG. 1, the tensioning device 10 of the present invention is there shown as being mounted coaxially onto a chuck 12 of a machining tool 14 such as a lathe. As shown in FIG. 1, the chuck 12 includes three circumferentially equidistantly spaced permanent jaws 16 although the chuck 12 may include any number of jaws 16. The jaws 16 are simultaneously radially adjustable by a conventional adjustment mechanism 18. The jaw adjustment mechanism 18 may comprise any conventional and well known means and accordingly will not be described or shown in greater detail. Such mechanism, however, generally includes gears or racks and because of this, there is backlash which enables the jaws 16 to move if they are not in tension or compression.

Figure 2:
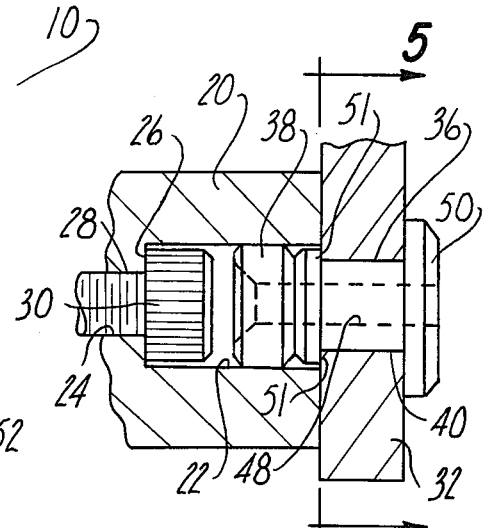
FIG. 2 is a fragmentary and partial cross sectional view taken substantially along line 2—2 in FIG. 1.

With reference now to FIGS. 1 and 2, a conventional soft jaw 20 is secured to each of the permanent jaws 16. Typically, each soft jaw 20 includes at least one and preferably two recesses 22 formed in the outwardly facing surfaces of the soft jaw 20 to thereby provide a means for attaching the soft jaws 20 to the permanent jaws 16. A reduced diameter through bore 24 is formed coaxially through the recesses 22 thus forming an annular abutment surface 26 at the base of recess 2. Bolt members 28 having enlarged head 30 which abut against the annular surface 26 threadedly engage appropriate bores in the permanent jaws 16 to thereby rigidly secure the soft jaws 20 onto the permanent jaws 16. This is a conventional method of securing the soft jaws 20 to the permanent jaws 16.

Figure 3:
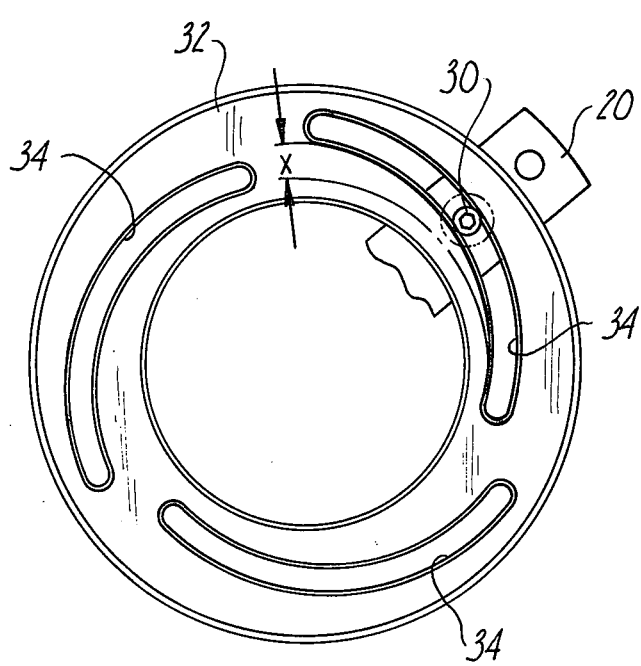
FIG. 3 is a front plan view showing the tensioning device of the present invention and with parts removed for clarity.

Referring to FIGS. 1 and 3, the tensioning device 10 comprises a flat ring 32 having a cam slot 34 formed therethrough for each of the soft jaws 20. Consequently, in the example shown, three cam slots 34 are provided through the ring 32 and the cam slots 34 are circumferentially equidistantly spaced around the ring 32. In addition for the purposes of this disclosure each of the cam slots 34 is defined as an eccentric arc wherein the centers of the eccentric arc for each cam slot 34 all lie on a common circle which is coaxial with the axis of the chuck 12 and wherein the centers of the arcs are circumferentially equidistantly spaced around this circle. With this construction the radial distance between the axis of the chuck 12 and the center of the slot 34 is substantially identical for each and every trisection of the ring 32.

A cam follower 36 is associated with each cam slot 34 and each soft jaw 20. The cam follower 36 includes a first cylindrical portion 38 which is axially received in one of the mounting recesses 22 of the soft jaw 20. The cylindrical portion 38 is preferably of a diameter to fit within the recess 22 so that the cylindrical portion 38 is fixed to the soft jaw 20 against both circumferential and radial movement.

Figure 4:
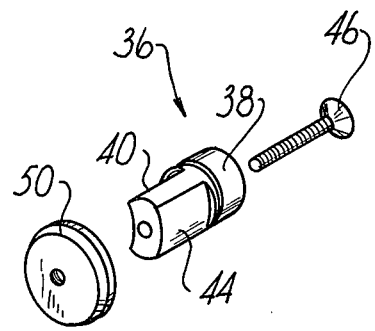
FIG. 4 is an exploded perspective view showing the cam follower for the tensioning device of the present invention.
Figure 5:
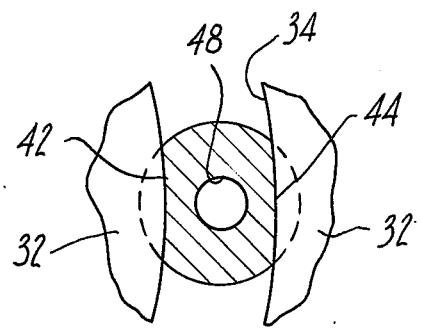
FIG. 5 is a fragmentary cross sectional view taken substantially along line 5—5 in FIG. 2 and enlarged for clarity.

The cam follower 36 comprises a second portion 40 which is axially received through the cam slot 34. The first portion 38 and the second portion 40 of the cam follower 36 are preferably integral with each other. As best shown in FIGS. 4 and 5, the inner and outer circumferential surfaces 42 and 44, respectively, of the second portion 40 are arcuately formed in th same radius as are the cam slots 34. Moreover, the radial width of the second portion 40 is substantially the same as the width of the cam slot 34 so that the second portion 40 of the cam follower 36 is slidably mounted along the cam slot 34.

In order to slidably retain the cam follower 36 to the flat ring 32, a bolt 46 is disposed through an axial bore 48 in the cam follower 36 and threadedly engages a cap 50 at the outwardly extending axial end of the flat ring 32. Also, as should be apparent from FIG. 2, the axial length of the second portion 40 of the cam follower 36 is substantially the same as the axial width of the flat ring 32 so that the flat ring 32 is sandwiched between the cap 50 and the abutment surfaces 51 on the first portion 38 of the cam follower 36.

With reference now particularly to FIG. 1, FIG. 3 in operation, the ring 32 is mounted coaxially on to the chuck 12 so that the first portion 38 of each cam follower 36 is received within the mounting recess 22 of the associated soft jaw 20. When the approximate radial position of the soft jaws 20 is obtained by the jaw adjustment mechanism 18, the ring 32 is rotated in either a clockwise or a counterclockwise direction. Due to the camming action between the eccentric cam slots 34 and the second portion 40 of the cam follower 36, the cam followers 36 move radially outwardly if the cam is moved in a clockwise direction and radially inwardly if the cam is moved in a counterclockwise direction. This movement of the cam ring is transmitted through the cam followers 36 to radially tension the soft jaws 20 of the chuck 12. By radially tensioning the soft jaws 20, the tensioning device 10 of the present invention eliminates the play or backlash of the jaw adjustment mechanism 18 which accordingly immobilizes the soft jaws 20. Thereafter the inner radial face of the soft jaws 20 may be machined by any appropriate means such as a boring bar 52, to the desired diameter.

Although the tensioning device 10 of the present invention has been thus far described in connection with tensioning the soft jaws 20 radially inward, it will be appreciated that the device 10 is also capable of tensioning the soft jaws 20 radially outward by merely reversing the direction of rotation of the flat ring 32. Tensioning the soft jaws 20 radially outward is desirable, for example, where the jaws 20 are intended to grasp the internal walls of a tube.

It can thus be seen that the tensioning device 10 of the present invention provides a simple and yet effective means for radially tensioning the jaws of the chuck 12 without the necessity of entrapping internal spacers between the jaws of the chuck.

Having thus described my invention, many modifications thereto will become apparent to those skilled in the art to which they pertain without deviation from the spirit of the invention as defined by the scope of the appended claims.

What is claimed is:

1. For use in conjunction with a chuck having at least two jaws, each jaw having a surface for gripping a workpiece, means for adjusting said jaws radially toward said workpiece; means for radially moving said jaws away from said workpiece and against said radial adjustment means comprising; a flat ring having at least two cam slots formed therethrough, said cam slots being formed as eccentric arcs wherein the centers of the eccentric arc for each cam slot lie on a circle which has as its center the axis of the chuck, said ring positioned coaxially on said chuck so that the ring is radially spaced from the workpiece gripping surfaces of said jaws;

at least two cam followers, each cam follower having a first portion and a second portion, wherein the first portion of each cam follower is fixed to each of said jaws and wherein the second portion of each cam follower is slidably received in one of said cam slots in said ring whereby rotation of said ring tensions each of said jaws radially away from said workpiece.

2. The invention as defined in claim 1 and including means for slidably retaining each of said cam followers to its associated cam slot.

3. The invention as defined in claim 2 wherein said last mentioned means comprises a fastener adapted to secure a cap onto the second portion of the cam follower so that said flat ring is sandwiched between said cap and said first portion of the cam follower.

4. The invention as defined in claim 1 wherein the inner and outer circumferential surfaces of said second portion of said cam follower are arcuately formed at substantially the same radius as the radius of the cam slot.

5. The invention as defined in claim 4 wherein the radial width of the second portion of the cam follower is substantially the same as the radial width of the associated cam slot.

6. The invention as defined in claim 1 wherein said first portion of said cam follower is received in a recess in its associated jaw and wherein the cross sectional shape of said recess is substantially the same as the cross sectional shape of the first portion of the cam follower.

7. The invention as defined in claim 6 wherein the first portion of the cam follower is cylindrical in cross section.

8. The invention as defined in claim 1 wherein each of said jaws is a soft jaw fixedly secured to a permanent jaw of the chuck.

* * * * *

UNITED STATES PATENT AND TRADEMARK OFFICE
CERTIFICATE OF CORRECTION

PATENT NO. : 4,041,612
DATED : August 16, 1977
INVENTOR(S) : Robert P. Skubic

It is certified that error appears in the above-identified patent and that said Letters Patent are hereby corrected as shown below:

Col. 1, line 25, delete "rigid", insert --rigidly--;

Col. 1, line 55, delete "ing", insert --ed--.

Col. 2, line 16, delete "follow", insert --follower--;

Col. 2, line 18, delete "jams", insert --jaws--.

Col. 3, line 12, delete "2", insert --22--;

Col. 3, line 13, delete "head", insert --heads--;

Col. 3, line 43, after "36", insert --further--;

Col. 3, line 49, delete "th", insert --the--;

Col. 3, line 65, delete "FIG. 1, FIG. 3", insert --FIG. 1 - FIG. 3--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*